United States Patent [19]
Riedel

[11] Patent Number: 5,242,529
[45] Date of Patent: Sep. 7, 1993

[54] APPARATUS FOR THE ULTRA-SONIC WELDING OF SEALING SEAMS

[75] Inventor: Thomas Riedel, Biebesheim, Fed. Rep. of Germany

[73] Assignee: Tetra Alfa Holdings S.A., Pully, Switzerland

[21] Appl. No.: 935,575

[22] Filed: Aug. 26, 1992

[30] Foreign Application Priority Data

Sep. 21, 1991 [DE] Fed. Rep. of Germany ....... 4131465

[51] Int. Cl.$^5$ .................... B29B 65/08; B32B 31/00
[52] U.S. Cl. ........................ 156/580.1; 156/73.1; 156/580.2; 425/174.2; 228/1.1
[58] Field of Search ............. 156/73.1, 73.4, 502, 156/580, 580.1, 580.2, 581; 425/174.2; 228/1.1, 5.5

[56] References Cited

U.S. PATENT DOCUMENTS

| | | | |
|---|---|---|---|
| 3,494,817 | 2/1970 | Whitecar | 156/567 |
| 3,956,046 | 5/1976 | Tsuchiya et al. | 156/73.4 |
| 4,145,236 | 3/1979 | Neumayer et al. | 156/73.1 |
| 4,251,303 | 2/1981 | Deimel et al. | 156/73.1 |
| 4,279,675 | 7/1981 | Braun | 156/73.1 |
| 4,403,465 | 9/1983 | Bachner | 53/477 |
| 4,581,873 | 4/1986 | Knuppertz et al. | 53/373 |
| 4,681,645 | 7/1987 | Fukushima et al. | 156/73.1 |
| 4,767,492 | 8/1988 | Fukishima et al. | 156/580.2 |

FOREIGN PATENT DOCUMENTS

| | | |
|---|---|---|
| 2812137 | 6/1985 | Fed. Rep. of Germany . |
| 3813187 | 11/1989 | Fed. Rep. of Germany . |
| 3935335 | 10/1990 | Fed. Rep. of Germany . |
| 2366996 | 5/1978 | France . |
| 62-179880 | 1/1988 | Japan . |
| 2017014A | 10/1979 | United Kingdom . |

Primary Examiner—David A. Simmons
Assistant Examiner—J. Sells
Attorney, Agent, or Firm—Paul and Paul

[57] ABSTRACT

The description relates to an apparatus for the ultrasonic welding of sealing seams on packages for fluid media. The apparatus comprises a sonotrode and an anvil (7) which is situated opposite the front end face of the sonotrode. Both sonotrode and also anvil (7) are adapted for movement on predetermined paths.

So that the bearings of the machine as a whole are not adversely affected by the vibrations of the sonotrode and thus also of the anvil and in order to guarantee good hygiene qualities, it is according to the invention envisaged that the anvil which is of solid construction should be traversed axially by at least one inner bore (12, 13, 14) in which, for neutralizing vibrations, a shaft (9; 10, 11) is disposed contactlessly via elastic flexible ring parts (16) so that an annular gap is formed, the outside diameter of the shaft being less than the inside diameter of the inner bore (12, 13, 14) and in that the outside diameter of the elastic ring part (16) is greater than the inside diameter of the inner bore.

14 Claims, 4 Drawing Sheets

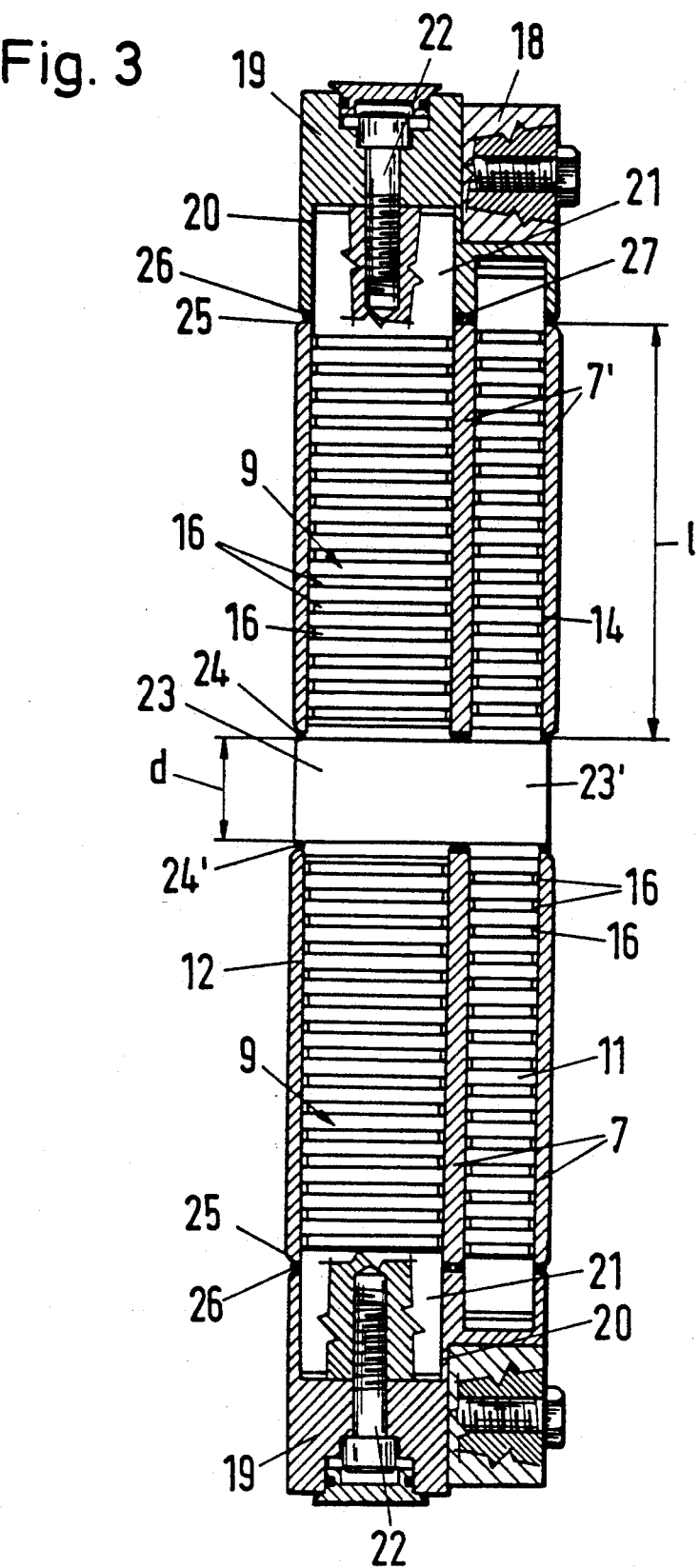
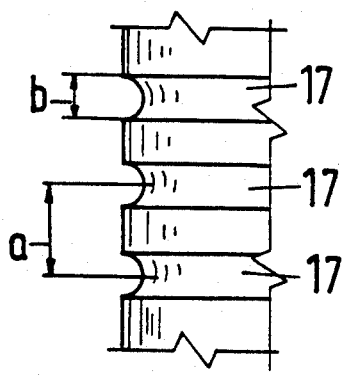
Fig. 3
Fig. 3a

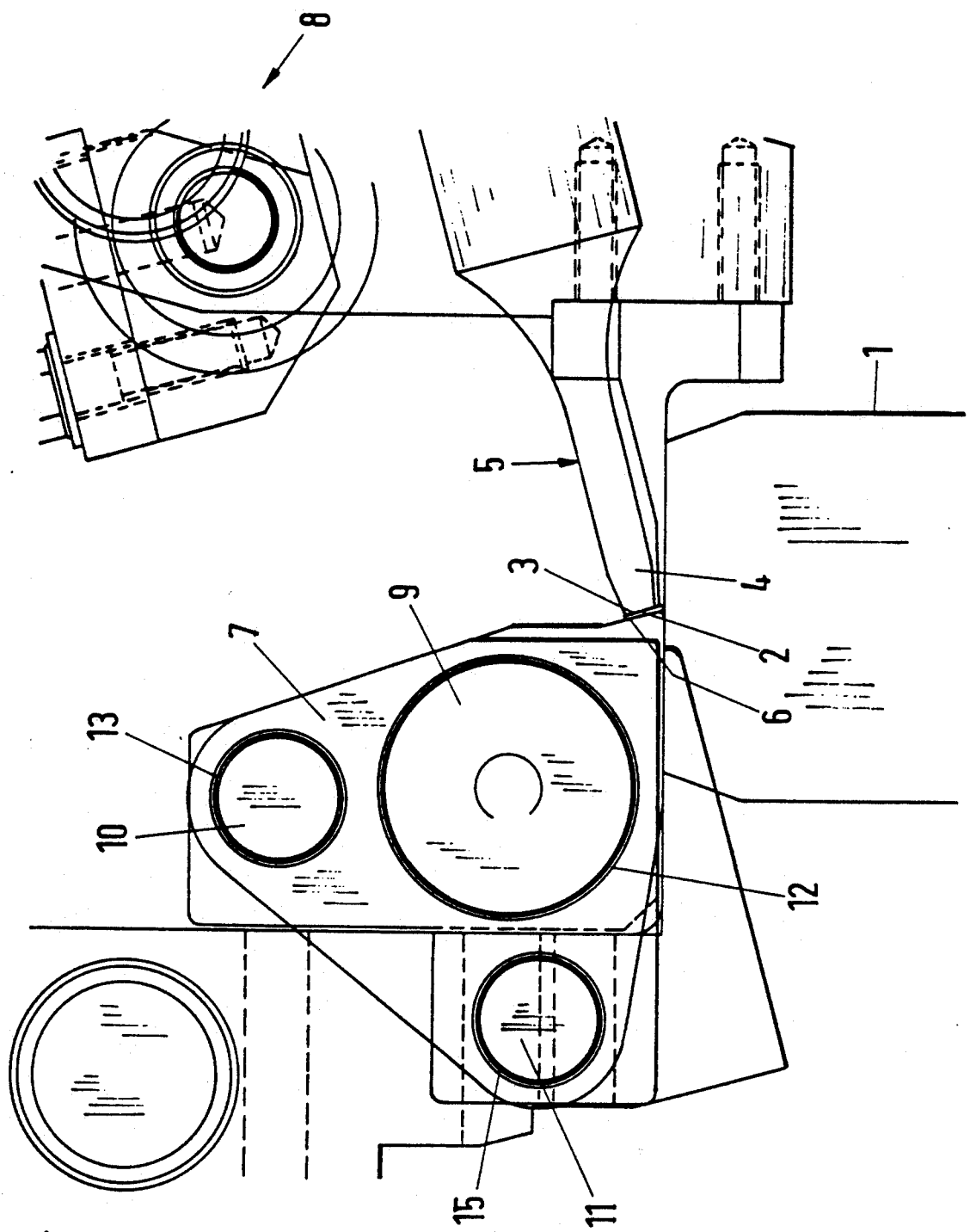

APPARATUS FOR THE ULTRA-SONIC WELDING OF SEALING SEAMS

The invention relates to an apparatus for the ultrasonic welding of sealing seams, particularly on the doubled cardboard strip of a package for fluid media, the apparatus comprising a sonotrode and, opposite its front end face, an anvil, both of which can be moved on predetermined paths.

In the field of manufacturing packages for liquids, it is known for the cross-sectionally rectangular open sleeve of paper coated on both sides with a synthetic plastics material to be so folded that a double strip of cardboard results, by means of which, once the package has been filled with liquid, it can be sealed by a welding process. This welding can be accomplished by sealing blocks, as well as by pulsed current arc welding or ultrasonic welding.

Ultrasonic welding sets with correspondingly constructed sonotrodes are already known. A prior art sonotrode consisting of titanium has a front face in the form of a strip-like plane, namely at the tip of the sonotrode, and the double cardboard strip which is to be sealed in a fluid-tight manner must be clamped between this front end face and a counter-block with a correspondingly strip-like plane and the ultrasonic welding energy must be applied at a precisely measured line. What is vital is a really accurate parallelism between the front end face of the sonotrode on the one hand and the counter-block or anvil on the other. In order to achieve good welding lines on the double cardboard strip, the tolerance in this parallelism is only a few hundredths of a millimeter.

In order to maintain an anvil and a sonotrode parallel with each other in such a precise manner, the machine parts which support the tools must be constructed to very close tolerances. This is not only very expensive due to high production costs, but a disadvantage is the short effective life because, as a result of the vibrations which are generated by the sonotrode, the bearings are worn out relatively quickly, so that quite soon at least the required close tolerances are no longer viable. In the case of the known systems, then, if the supporting bearings, preferably rolling-type bearings, gears and the like are heavily stressed by the vibrations and are damaged after a comparatively short time, then the quality of the sealing seam to be produced suffers and with it the sealing-tightness of a fluids package.

For this field of application, but also for other applications where flat materials have to be connected to one another by a good seal, the disadvantages described exist if one otherwise uses the system of ultrasonic welding, which has many advantages.

Regardless of but particularly for this technical field of package production, therefore, the problem according to the invention is that of providing an apparatus of the type mentioned at the outset in the most competitively priced way, designing and disposing it in such a way for good ultrasonic welding that the bearings and drive means of the machine in which the ultrasonic welding apparatus is fitted are not adversely affected by the vibrations, good hygiene qualities are assured, especially in the manufacture of packages for fluid media while in general, in spite of these conditions, the parallelism of the welding surfaces on the sonotrode and anvil can be maintained within close tolerance limits.

According to the invention, this problem is resolved in that the solidly constructed anvil is axially transversed by at least one inner bore in which, in order to neutralize vibrations, a shaft is disposed in contactless manner via elastic flexible ring parts, forming an annular gap, the outside diameter of the shaft being smaller than the inside diameter of the inner bore and in that the outside diameter of the elastic ring part is greater than the inside diameter of the inner bore, and in that the anvil is subject to initial tension in the shaft described.

For a man skilled in the art, having knowledge of the state of the art and faced with the aforementioned problem, it might possibly have become evident to neutralize the vibrations less in the region of the anvil or perhaps nowhere at all near the anvil, but instead in the bearing region between the vibration source and the machine. Instead of an expensive insulation from the anvil which is vibrating itself and which is energised by vibrations, rearwardly to its bearings and supports and at the same time from the welding tool backwards, in other words through a closed bearing circuit, the desired insulation and neutralization are according to the invention accomplished in the region of the anvil. Surprisingly, this can be achieved in that the shaft supporting the anvil is supported in such a way that there is no contact with the vibrating anvil, i.e. there is no impact of metal on metal. To fulfil the supporting activity, there are the elastic flexible ring parts which fill the annular gap between the shaft which is of smaller outside diameter and the inner bore which is of greater inside diameter. Furthermore, if the ring parts are sufficiently large, then insulation from harmful vibrations can take place within the region of the anvil. The ring part used is preferably of annular cross-section in a radial direction and the rings may be of different lengths in an axial direction. Longer ring parts may be described as sleeves while shorter ring parts are more readily described as rings. By virtue of the ratio of diameters between bore and ring parts, provided for within the invention, the shaft is seated in the inner bore of the anvil with a certain initial tension. Consequently, the anvil is advantageously elastically suspended on the shaft. Consequently, there is a very favourable radial insulation, the aforesaid ring parts being the actual insulating members.

Therefore, there is no longer any need to provide in the entire bearing area from the anvil backwards on the one hand and also from the welding tool backwards on the other, in other words in the closed bearing circuit, bearings with very close tolerances which would represent high production costs. Instead, the ring parts in the advantageous arrangement in the inner bore of the anvil assume the necessary tasks without any adverse effects on the other conditions required for carrying out precise ultrasonic welding.

It is particularly advantageous if, in a further development of the invention, there are in the outer surface of the shaft, in its axial direction, a plurality of grooves which are spaced apart from one another and which at least partially accommodate the ring parts. From the engineering point of view, it is simple to provide grooves which are axially spaced apart from one another on a shaft. These grooves may be of different widths, different depths and may be spaced apart from one another by different amounts. Some of them may be provided with the said ring parts and some may be empty. The above-described insulation can be entirely guaranteed by the corresponding number of ring parts and by their being suitably designed. This arrangement of ring parts in various distributions in grooves in an axial longitudinal direction is particularly effective if one bears in mind the parallelism of the oppositely acting surfaces of sonotrode and anvil. The above-mentioned parallelism can in fact be easily adjusted by means of these ring parts. The measures according to the invention not only save on costs but the manufacturing conditions are fulfilled and in the case of packages for liquids, even the hygiene requirements are guaranteed. Where the use of prior art neutralizing or insulating means is concerned, a rubber part vulcanised between welded parts was often so adversely affected by cleaning that hygiene problems arose. This was particularly critical with regard to the manufacture of packages for milk, because milk becomes deposited in every crack and on any rough surface of damaged parts, where it can lead to serious hygiene problems.

It has been found to be particularly advantageous for the ring parts to be O-rings, preferably with different stiffness ratings "C". Sometimes this hardness is referred to as Shore hardness. Using such O-rings not only guarantees a technically very simple handling and maintenance of the system but also costs can be greatly reduced. It is well-known that O-rings are easily acquired and inexpensive spare parts. Maintaining stocks of spare parts thus becomes easy and at the same time production costs are minimal while the damping and stiffness of the carrier system can be varied within wide limits. The parallelism can be maintained within the desired tolerance limits by inexpensive means, because the O-rings ensure practical self-equalization. Using the O-rings as damping members easily prevents metallic contact between the anvil and its carrier system. Damping can be varied not only as a whole but also over the length of the anvil. For example, the number of O-rings or even their Shore hardness or stiffness can be altered over the length of the shaft. Thus it is possible very easily to alter the self-adjustability of the system.

It has been found that in simpler embodiments a single shaft in the anvil can be sufficient as a supporting element to accommodate all the forces likely to arise in operation. In such cases, therefore, it is sufficient for the anvil to be traversed by just one single bore into which a carrier shaft is pushed. If more exacting demands are made of the ultrasonic welding system, then it is expedient for torque levels which are created by the welding force introduced, i.e. by the pressure which the sonotrode applies to the oppositely disposed welding surface of the anvil, to be separately accommodated. In order to form this improved apparatus, it is expedient if, according to the invention, the anvil is traversed axially and in a parallel arrangement by three inner bores for holding two supporting shafts and a carrier shaft mounted on the machine as a whole and preferably constructed from stainless steel. The very solidly constructed anvil has to withstand considerable forces and vibrations which is why it should be produced from a good quality steel; if it is to be used in machines which represent a hygiene hazard, then this should preferably be stainless steel.

Ultrasonic welding apparatus in which the torque levels are absorbed by just one single supporting shaft, disposed separately from the carrier shaft, is possible. However, there may be marginal conditions which make it seem appropriate to mount not only on a carrier shaft and additionally a separate supporting shaft but also on a second and separate supporting shaft. Such an embodiment is considered here as particularly advantageous because in many respects it is more efficient. The torque levels introduced by the aforesaid welding force are obviously even better accommodated and supported by two separate supporting shafts than by just one separate supporting shaft in addition to the carrier shaft. If the carrier shafts are very long, then when forces are introduced, there could be a deflection of the anvil system and this is generally and mainly absorbed by the carrier shaft itself. The torque levels arising due to welding forces on the other hand are, with the preferred embodiment described here, preferably absorbed by the two supporting shafts. Even a construction with a third supporting shaft would be conceivable. However, practical experience has shown that even with particular embodiments with a long carrier shaft and a long anvil (or even with a plurality of serially disposed anvils), the deflection of the carrier shaft and the torque levels are accommodated by two supporting shafts. This is not contradictory to the idea that also the supporting shafts have a certain carrying function.

The greater the distance between the supporting shafts and the carrier shaft, the smaller the diameter of the supporting shafts and also of the carrier shaft can be since as the gap becomes greater, so the moments of area and resistance increase. However, what is involved here are special questions of available space and it must be remarked that in general machines should be as small as possible so that little space is available. Furthermore, in the case of an advantageous development of the invention, it is expedient if the carrier shaft is mounted in supports rigid with the machine, held by fitting members engaging around its ends. The forces arising can, in line with the foregoing remarks, depend upon the spacing between the supports on which the carrier shaft is mounted. The shaft itself is held by fitting members into which the ends of the carrier shaft are inserted and fixed. By means of the supports which are rigid with the machine, the concept of the invention becomes clear which is in fact that the carrier shaft is provided as a mounting rigid with the machine while the vibrating anvil is disposed separately and in a contactless manner. Therefore, it is within the region of the anvil that the vibrations are neutralized because the carrier shaft, rigid with the machine, braces the vibrating anvil via the ring parts which are provided in accordance with the invention.

According to the invention, it is furthermore advantageous to dispose between the shoulder of the fitting member and the end face of the anvil an O-ring of elastic flexible material which can be clamped in place by at least one screw which projects axially into the end of the carrier shaft and through the fitting member. The described O-ring of synthetic plastics material, rubber or an elastomer is, according to the invention, disposed between the fitting member (via its shoulder) or the anvil (its flat end face) and, by virtue of the fact that it is clamped by tightening of the screw, it allows damping and also a neutralization of vibrations in an axial direction. Whereas the neutralization of vibrations in a radial direction is accomplished by the aforementioned ring parts, by O-rings in a preferred embodiment, there is also provision for axial neutralization, namely the latterly described O-ring between fitting member and anvil.

In the case of radial neutralization, dimensioning of the ring parts ensures that the shaft, preferably the carrier shaft, is seated in the inner bore of the anvil with a certain amount of initial tension, so that its suspension is resilient, producing a radial neutralization. Therefore, any metallic contact between carrier shaft and anvil is entirely out of the question, particularly under load. In other words, it is envisaged that the annular gap is greater than the deformation of the anvil which occurs under load and in comparison with the carrier shaft. The same conditions apply in respect of the supporting shafts.

According to the invention, therefore, in a radial and also in an axial manner, it is possible to neutralize the vibrations which are harmful to bearings and gearing by the use of simple means.

According to the invention, it is furthermore advantageous to dispose on the carrier shaft and the at least one supporting shaft extending parallel therewith two axially serially disposed anvils which are spaced apart by shoulders formed on the shafts, O-rings being provided between shoulder and anvil. Designers' experience has shown that the concept according to the invention can also be used with machines of very high performance, in which the number of welds per unit of time can even be doubled by disposing two ultrasonic welding stations one beside the other so that two anvils are spaced apart axially from each other on the carrier shaft. Instead of the end faces of the fitting member, it is possible in the region between the two anvils to use the end face of the shoulders so that otherwise the measures according to the invention can be used in the same way. If there is a supporting shaft disposed separate from and parallel with the carrier shaft, two anvils can be used. If particular forces and torque levels are needed, then it is possible to use two supporting shafts in addition to the one carrier shaft. In spite of the considerable weights of two anvils on a single carrier shaft, the deformations of the two anvils can be accommodated by one carrier shaft and the torque levels created by the welding forces can be accommodated by the supporting shafts. As a result of the disposition and dimensioning of the ring parts, the bearings and drive means of the machine are no longer adversely affected by the unavoidable vibrations and by disposing the O-rings between anvil and shoulder or between anvil and end face of the fitting member, axial encapsulations are provided so that even if preserving agents are used in the annular space between the carrier shaft and the anvil or between the supporting shaft and the anvil there is no possibility of this preserving agent emerging from the annular space and the entire machine will enjoy good hygiene qualities.

Further advantages, features and possible applications of the present invention will emerge from the ensuing description, in conjunction with the attached drawings, in which:

FIG. 3 is a sectional view through FIG. 2 taken on the line III—III in FIG. 2;

FIG. 3a shows an enlarged and broken away part of the surface of the carrier shaft without ring parts;

FIG. 4 is a broken away view of part of the machine with the ultrasonic welding apparatus with the sonotrode in functional engagement with the anvil over the doubled cardboard strip of a package;

Figure 5:
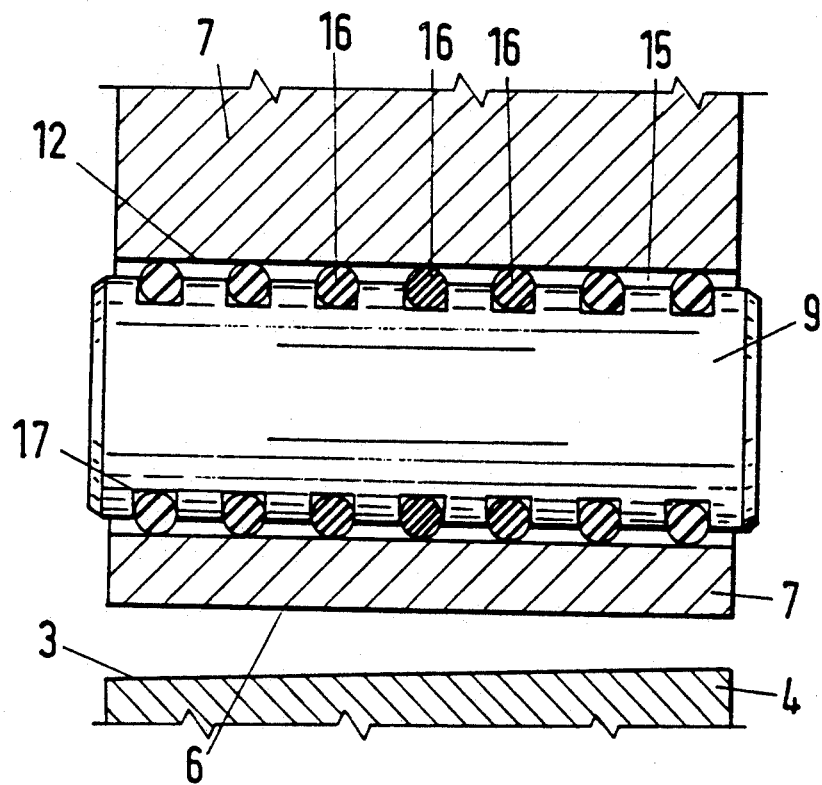
Figure 6:
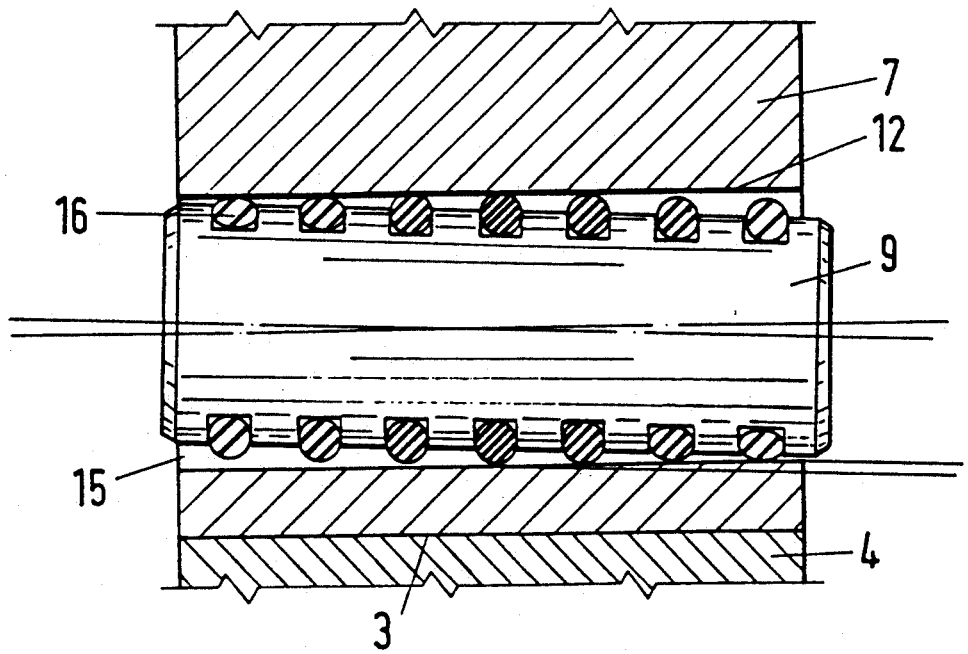

FIG. 5 diagrammatically shows the construction of a carrier shaft with O-rings inside the inner bore in an anvil and broken away, tilted at an angle below it, a sonotrode prior to functional engagement, and FIG. 6 shows the functional engagement of the tilted tip of the sonotrode shown in a broken away representation, against the anvil with the subsequent tilting thereof in relation to the carrier shaft.

The package 1 intended for a fluid medium and shown in FIG. 4 has at its upper end a doubled cardboard strip 2 formed by fold lines, not shown, and which is just clamped between the front end face 3 of the tip 4 of a sonotrode 5 and the oppositely disposed welding surface 6 of an anvil 7. The clamping is accomplished by movement of the sonotrode 5 via its drive 8 and in relation to the anvil 7 which is likewise adapted for movement on a given path, not shown. Between the (not shown) two positions of the doubled cardboard strip there is a sealing seam which is to be produced by ultrasonic welding and which is not especially shown because it is known to any man skilled in the art.

Although the apparatus for ultrasonic welding which is described here in conjunction with packages for fluid media and having a doubled cardboard strip where there is a sealing seam, the application of the concept according to the invention is of course not confined to this specific field of technology.

Figure 1:
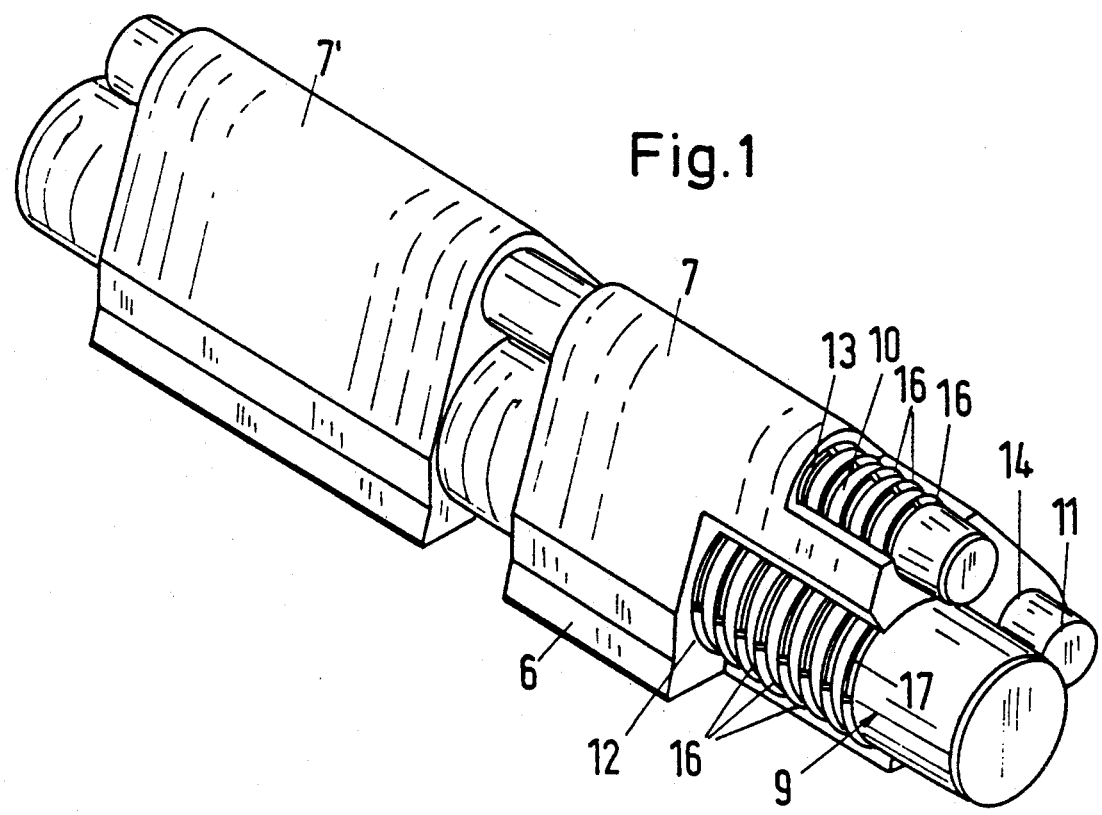
FIG. 1 shows in perspective two anvils disposed axially one after another on a carrier shaft and two supporting shafts.

Shown in FIG. 1 are two anvils 7 and 7' spaced apart by the distance d on a carrier shaft 9 and additionally and separately therefrom and parallel therewith two supporting shafts 10 and 11. Hereinafter, it is sufficient to describe one anvil 7, because also the other anvil 7' is constructed to be identical to the first-mentioned anvil 7.

Figure 2:
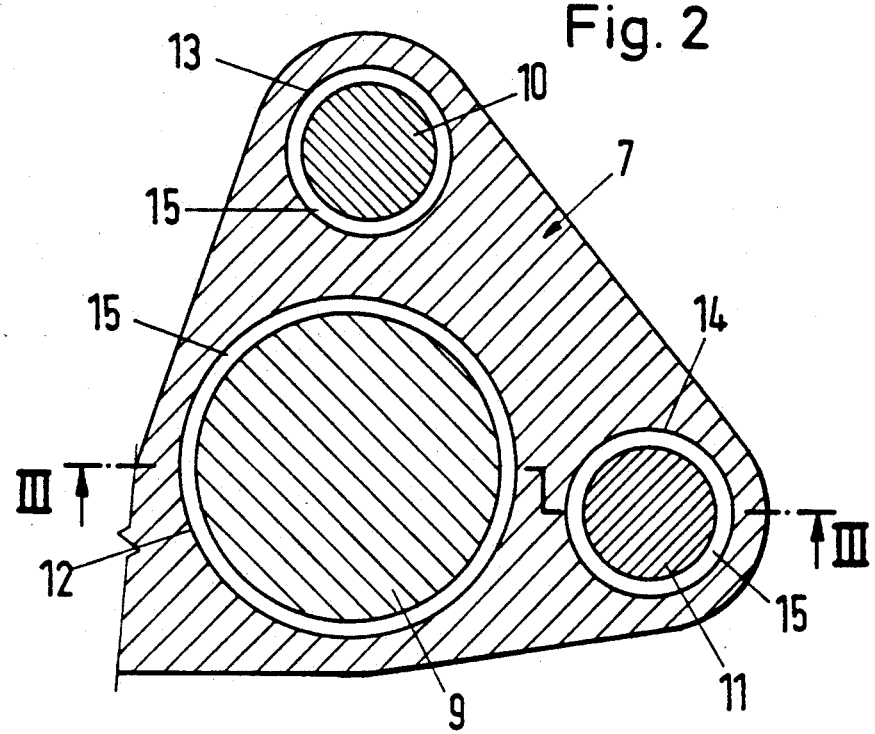
FIG. 2 is a cross-sectional view through the anvil at right-angles through the shafts.

The anvil 7 is traversed by three inner bores 12 (for the carrier shaft 9), 13 (for the first supporting shaft 10) and 14 (for the second supporting shaft 11. These three inner bores 12, 13, 14 are of different diameters and are so spaced apart from one another that in cross-section as shown in FIG. 2 their axes form a triangle. The diameter of the first inner bore 12 for the carrier shaft 9 is the largest while the diameter of the bores 13 and 14 for the two supporting shafts 10 and 11 are identical and are smaller than that of the bore 12.

Mounted in a contactless fashion, i.e. with no metallic contact, the shafts 9 (carrier shaft), 10 (first supporting shaft) and 11 (second supporting shaft) are mounted inside these bores 12, 13 and 14. Each shaft is surrounded by an annular gap (15) which is particularly clearly shown in FIG. 2. The annular gaps 15 can however also be discerned in FIGS. 4 to 6. The annular gap 15 is formed because the outside diameter of the relevant shaft 9 or 10 or 11, as the case may be, is smaller than the inside diameter of the relevant inner bore 12 or 13 or 14 respectively.

So that the anvil 7 can be fitted on the shafts 9 to 11, ring parts 16 in the form of O-rings are disposed in grooves 17, the width of which is indicated as b in FIG. 3a. In the example shown here, the distance a between the grooves 17 in an axial direction of the shafts 9 to 11 is the same and also the width b of the grooves 17 is the same for all shafts 9 to 11 and grooves 17. However, this only applies to the preferred embodiment shown here. Thus, the mounting of the anvil 7 is described with reference to shafts 9 to 11. The carrier shaft 9 and its supporting arrangement are described as a representative shaft rigid with the machine. Provided on the supports 18 which are only partially in FIG. 3 are fitting members 19 with fits or fitting members 20 which engage around and accommodate the ends 21 of the carrier shaft 9. Projecting axially from outside into a screwthreaded bore in the end 21 of the carrier shaft 9 is a screw 22 which so passes axially from outside and through the fitting member 19 that clamping of the anvil 7, 7' in relation to the fitting member 19 is made possible by tightening the screw 22.

This is described more precisely with reference to FIG. 3. There, the carrier shaft 9 is shown elongate with, incorporated in the centre, a shoulder 23 (the proportions are similar in the case of the supporting shaft 11, where the shoulder is designated 23'). In an axial direction, the shoulder 23 has on either side an annular shoulder on which bears a medium O-ring 24 or 24', of which the oppositely disposed bearing surface is the flat annular surface of the anvil. On the outsides, the anvil 7, 7' in turn has plane annular end faces 25 so that there too it is possible to provide an outer O-ring 26 which in turn bears axially from outside and against the annular shoulder 27 of the fitting member 20.

If the length of the anvil 7' or that of the anvil 7 is designated 1, then where the construction of the embodiment shown in the drawings is concerned, the length 1, for instance of the anvil 7', is shorter than the distance between the plane annular shoulder surface 26 of the fitting member 20 and the annular plane surface of the shoulder 23. The gap of for example 1 5 mm width which results at the two ends of the anvil is filled by the O-rings 24 and 26 described. These O-rings are resistant to a cleansing agent and provide for encapsulation and at the same time an axial insulation against vibration. The O-rings are pressed together by the previously described screw 22.

Therefore, the distance d between the two anvils 7, 7' according to FIG. 3 is formed by the shoulders 23 and 23'. The diameter of these shoulders, e.g. of the shoulder 23, is somewhat greater than the outside diameter of the relevant shaft, e.g. the carrier shaft 9 (or in the case of the shoulder 23', of the supporting shaft 11). Provided at the top and bottom in the fitting member 19 is the fit 20 into which is pushed the end 21 of the carrier shaft 9. The end faces of the carrier shaft 9 are therefore applied now against the bottom of the bore in the fitting member 20 in the member 19. By tightening the aforementioned screws 22, the two anvils 7, 7' are tightened up against the middle shoulder 23.

In principle, the method of functioning is explained with reference to FIGS. 5 and 6. These drawings again show diagrammatically the carrier shaft 9 which is shown as being short, and in the grooves 17 of which O-rings of different shading are inserted. A coarse shading denotes minimal rigidity while a fine shading denotes a high level of stiffness. It can be seen that in FIG. 5 the O-ring 16 with the longest reference line has the finest shading and thus the greatest level of stiffness, which diminishes symmetrically outwards in an axial direction. For example, the outermost O-ring in FIG. 6, the reference line of which extends horizontally, has the lowest level of stiffness. It can also be seen here that the diameter of the carrier shaft 9 is smaller than that of the inner bore 12. The annular gap 15 between these two surfaces between carrier shaft 9 and inner bore 12 of the anvil 7 is not equal to nil even under load. This means that even under a load there is no metallic contact between carrier shaft 9 and anvil 7. The gap 15 is therefore larger than the load-induced deformation of the anvil 7 vis-a-vis the carrier shaft 9. The same situation arises also with reference to the supporting shafts 10 and 11.

Each O-ring 16 seated in a groove 17 is entirely separate from its neighbor. It can be seen that the relevant outside diameter of the O-ring 16 is greater than the inside diameter of the bore 12 in the anvil 7. Thus, the carrier shaft 9 is seated under initial tension in the bore 12 in the anvil 7. This means that the above-described elastic suspension and therefore the radial insulation are provided. By reason of the O-rings 25 described with reference to FIG. 3 there is in the region of the ends 21 of the carrier shaft 9 an encapsulation of the annular space 15 in respect of the outside ambient, which results in good hygiene.

Compensation for parallelism is provided by the flexible disposition of the O-rings of various grades of stiffness or Shore hardness and can be clearly described with reference to FIGS. 5 and 6.

FIG. 5 shows the carrier shaft 9 with the anvil 7 which is shown broken away at the top. At a distance below its bottom edge, i.e. the sealing surface 6, there is an intentionally exaggerated broken away view of the tip 4 of the sonotrode which is inclined downwardly at an angle.

If this now moves into a functional position, so that its front end face 3 is pressed against the sealing surface 6 of the anvil 7 (FIG. 6 does not show a doubled cardboard strip in between the two), then also the anvil 7 tilts in relation to the carrier shaft 9 which is rigid with the machine. FIG. 6 shows the position under load and it can be seen that the annular gap 15 is greater than the deformation of the anvil 7 compared with or due to the carrier shaft 9. Here, parallelism is equalised by the flexible disposition of the ring parts 6 seated in the grooves 17, in this case the O-rings of different Shore hardnesses or stiffness. By reason of the disposition, design and effect of the ring parts 16, a regular welding force is reached which is within the framework of close tolerances constant over the entire welding surface 6 of the anvil. The forces created by the deformation of the O-rings 16 or the corresponding reaction force is advantageously less than the admissible deviation. Despite the tilting of the bore 12 in the anvil 7 compared with the carrier shaft 9, the equalisation of parallelism desired is achieved. The sum of the reaction forces arising out of the deformed O-rings 16 lies within the admissible range of tolerances in respect of welding force.

Of course, the same situation applies equally well to the supporting shafts 10 and 11.

By reason of the disposition of the O-rings 16, which are furthermore hygienically encapsulated, a sufficient bending resistance moment is available even if the carrier shaft 9 is long. Consequently, insulation from the vibrations takes place within the bore in the anvil.

Advantageously, the weight of the overall anvil system can also be reduced by disposing relatively thin carrier and supporting shafts at a relatively great radial distance from one another. This measure results in high surface and resistance moments.

This is particularly true where a plurality of anvils are serially disposed and where this entails a considerable span between the supports (fitting members).

I claim:

1. An apparatus for the ultrasonic welding of sealing seams, particularly on the doubled cardboard strip (2) of a package (1) for fluid media, the apparatus comprising a sonotrode (5) and, opposite its front end face (3), an anvil (7), both of which can be moved on predetermined paths, characterised in that the solidly constructed anvil (7, 7') is axially traversed by ay least one inner bore (12, 13, 14) in which, in order to neutralized vibrations, a shaft (9; 10, 11) is disposed in contactless manner via elastic flexible ring parts (16), forming an annular gap (15), the outside diameter of the shaft being smaller than the inside diameter of the inner bore (12, 13, 14) and in that the outside diameter of the elastic ring part (16) is greater than the inside diameter of the inner bore (12 to 14).

2. An apparatus according to claim 1, characterized in that in the outer surface of the shaft (9, 10, 11) in its axial direction there are a number of grooves (17) spaced apart from one another by the distance (a) and which at least partially accommodate the ring parts (16).

3. An apparatus according to claim 1 or 2, characterized in that the ring parts (16) are O-rings which preferably have different degrees of stiffness "C".

4. An apparatus according to any one of claims 1 to 2, characterized in that the anvil (7, 7') is traversed axially and in a parallel arrangement by three inner bores (12, 13, 14) for holding two supporting shafts (10, 11) and a carrier shaft (9) mounted on the machine as a whole, and in that the anvil is preferably constructed from stainless steel.

5. A apparatus according to any one of claims 1 to 2, characterized in that the carrier shaft (9) is mounted at its ends (21) in supports (18) rigid with the machine, held by fitting members (20) which engage around the ends (21).

6. An apparatus according to claim 5, characterized in that between shoulder (27) of the fittinq member (20) and end face (25) of the anvil (7) there is an O-ring of flexible elastic material and which is adapted to be clamped in place by at least one screw (22) which projects axially into the end (21) of the carrier shaft (9) and through fitting member (19).

7. An apparatus according to any one of claims 1 to 2, characterized in that on the carrier shaft (9) and the at least one supporting shaft (10, 11) extending parallel therewith are at least two anvils (7,7') which are disposed axially serially and are supported by shoulders (23, 23') formed on the shafts (9, 10, 11) at spacing (d) and in that O-rings (16) are provided between shoulder (23, 23') and anvil (7, 7').

8. An apparatus according to claim 3, characterized in that the anvil (7, 7') is traversed axially and in a parallel arrangement by three inner bores (12, 13, 14) for holding two supporting shafts (10, 11) and a carrier shaft (9) mounted on the machine as a whole, and in that the anvil is preferably constructed from stainless steel.

9. An apparatus according to claim 3, characterized in that the carrier shaft (9) is mounted at its ends (21) in supports (18) rigid with the machine held by fitting members (20) which engage around the ends (21).

10. An apparatus according to claim 4, characterized in that the carrier shaft (9) is mounted at its ends (21) in supports (18) rigid with the machine, held by fitting members (20) which engage around the ends (21).

11. An apparatus according to claim 3, characterized in that on the carrier shaft (9) and the at least one supporting shaft (10, 11) extending parallel therewith are at least two anvils (7, 7') which are disposed axially serially and are supported by shoulders (23, 23') formed on the shafts (9, 10, 11) at spacing (d) and in that O-rings (16) are provided between shoulder (23, 23') and anvil 7, 7').

12. An apparatus according to claim 4, characterized in that on the carrier shaft (9) and the at least one supporting shaft (10, 11) extending parallel therewith are at least two anvils (7, 7') which are disposed axially serially and are supported by shoulders (23, 23') formed on the shafts (9, 10, 11) at spacing (d) and in that O-rings (16) are provided between shoulder (23, 23') and anvil 7, 7').

13. An apparatus according to claim 5, characterized in that on the carrier shaft (9) and the at least one supporting shaft (10, 11) extending parallel therewith are at least two anvils (7, 7'), which are disposed axially serially and are supported by shoulders (23, 23') formed on the shafts (9, 10, 11) at spacing (d) and in that O-rings (16) are provided between shoulder (23, 23') and anvil 7, 7').

14. An apparatus according to claim 6, characterized in that on the carrier shaft (9) and the at least one supporting shaft (10, 11) extending parallel therewith are at least two anvils (7, 7') which are disposed axially serially and are supported by shoulders (23, 23') formed on the shafts (9, 10, 11) at spacing (d) and in that O-rings (16) are provided between shoulder (23, 23') and anvil (7, 7').

* * * * *

UNITED STATES PATENT AND TRADEMARK OFFICE
CERTIFICATE OF CORRECTION

PATENT NO. : 5,242,529
DATED : Sep. 7, 1993
INVENTOR(S) : Thomas Riedel

It is certified that error appears in the above-indentified patent and that said Letters Patent is hereby corrected as shown below:

Column 7, line 27, "1 5 mm" should read -- 1.5 mm --.

Signed and Sealed this

Twelfth Day of April, 1994

Attest:

BRUCE LEHMAN

Attesting Officer     Commissioner of Patents and Trademarks